United States Patent [19]

Fantozzi et al.

[11] Patent Number: 4,487,502

[45] Date of Patent: Dec. 11, 1984

[54] MODEL EO 1000 MULTISPECTRAL COMPUTERIZED LENS EVALUATION STATION

[75] Inventors: Louis R. Fantozzi, Massapequa; Lawrence Kessler, Bethpage; Richard Draxler, West Babylon, all of N.Y.

[73] Assignee: Diversified Optical Corporation, Farmingdale, N.Y.

[21] Appl. No.: 26,445

[22] Filed: Apr. 2, 1979

[51] Int. Cl.³ .............................................. G01B 9/00
[52] U.S. Cl. ...................................... 356/125; 356/51
[58] Field of Search ...................... 356/124, 124.5, 125, 356/126, 127

[56] References Cited

U.S. PATENT DOCUMENTS 4,147,430 4/1979 Gorgone et al. ...................... 356/51

OTHER PUBLICATIONS

Moore et al., "Production Lens Quality Evaluation" *Optical Engineering*, vol. 12, No. 5 (Sep.-Oct. 1973) pp. 155-160.
Haig N. D., "Transverse Ray Aberration Measurement at 10.6 Microns" Image Assessment & Specification Conference, Rochester, N. Y. May 20-22, 1974 pp. 294-298.
Dutton, D. "Procedure for Over-all Lens Evaluation" *Applied Optics* vol. 11, No. 5 (May 1972) pp. 1091-1100.
Aznarez et al. "Contribution à la détermination des fonctions de transfert" *Optic Acta* vol. 21, No. 10 (Oct. 1974) pp. 809-817.

*Primary Examiner*—R. A. Rosenberger
*Attorney, Agent, or Firm*—Ostrolenk, Faber, Gerb & Soffen

[57] ABSTRACT

A device for use with infrared lenses to determine the optimum focal plane. The device comprises an infrared energy source, a collimating lens and an energy sensor to determine the energy level from the energy source to provide a normalizing signal. An infrared energy detector may be moved toward and away from the lens which is to be calibrated in order to test various planes within the depth of focus of the lens. A knife edge shutter is stepped across the path of energy at each of the positions to determine specific read outs of energy at each position of the knife edge shutter. The energy which passes the knife edge shutter is then delivered to a computer where the signal has been normalized by the sensor previously described. The computer reads out the signals corresponding to energy level at successive steps of the knife edge shutter. The computer is programmed to step the detector to successive positions and then the shutter to successive positions across the focal plane. The computer is also programmed to select a detector position between the two best energy levels and provide a readout for that position and to select once more if necessary between the two best energy levels and provide a readout for this position until no discernable change in energy output is obtained.

4 Claims, 5 Drawing Figures

|  | | M.T.F. |
|---|---|---|
| ELE 1 | $R_1 = -.035$<br>$ct = .029"$<br>$R_2 = -.058$ | GERMANIUM f/1.0 FIELD LENS |
|  | AIR = .010 | 10X SCALE |
| 2 | $R_3 = -.230$<br>$ct = .041$<br>$R_4 = -.194$ | GERMANIUM 3X MAG. |
|  | AIR = .072 | f/1.0 COLLECTION |
| 3 | $R_5 = 20.9$<br>$ct = .138$<br>$R_6 = -.565$ | GERMANIUM |

.050 ⌀ OFF AXIS BUNDLE
.055 ⌀ ON AXIS BUNDLE

MODEL EO 1000 MULTISPECTRAL COMPUTERIZED LENS EVALUATION STATION

The present invention is directed to a device which will measure the optical parameter of a lens with a minimum amount of operator intervention. While the device is intended for use in production lines it may be expanded into a general purpose instrument by minimal changes in the software as hereinafter described.

The primary object of the present invention is the testing of infrared lenses in order to determine the position of greatest resolving power or the optimum focal plane within the imputed depth of focus attributable to the lens at any particular position and any particular stop opening.

Since all of the elements are to operate to test infrared lenses, ordinary systems which are used for testing of visual lenses are not available. However, the present system may be utilized for testing visual lenses in order to determine their resolving power and modulation transfer function.

In a lens which transmits visual light various means may be utilized to determine resolving power of the lens including grid test patterns. As the number of lines in the grid per unit area are increased the ability of the lens to separate the lines determine its resolving power.

In infrared lenses such visual testing cannot occur. However, a system is known in which the energy passed through a portion of a infrared lens may be measured and a determination may be made of the resolving power of the infrared lens at any position.

In the construction and operation of the present invention, infrared energy is emitted from a source. The energy is then passed through an appropriate filter, chopper and aperture which is in the focal plane of a collimator. The size of the aperture and the focal length of the collimator are chosen to provide the desired spot size in the focal plane of the lens under test. The energy passes from the collimator to a folding mirror which is rotated to a position in which the parallel or coherent infrared light input, either on axis or off axis, to the lens under test is determined. The energy then enters the lens under test which is held in a fixture to allow repeatable and predictable placements so that the flange focus can be measured accurately. The energy is focused by the test lens directly in front of a field lens. The field lens focuses the exit pupil of the test lens onto the signal detector. The advantage of the field lens includes:

1. The energy exiting from the test lenses impinges upon the detector independently of the focal point of the test lens within the specified tolerance. Therefore there is no need to hunt for a peak signal.
2. The energy is spread over the detector removing problems due to "hot spots" on the detector. 3. A knife edge shutter scans in the convergent beam of the test lens obscuring the detector. The knife edge is driven from the reference point by a step motor moving across the focal plane. 4. The output of the signal detector is converted to a digital output and fed into a computer. This data is used to compute the modulation transfer function. 5. While the measurement is under way the infrared source is also viewed by a reference detector to determine whether there is any drift in the source over the period of the measurement, of the modulation transfer function. The reference detector output is sampled each time the data detector is sampled. Any change in the reference detector is then used to compute a normalizing factor for the modulation tranfer of function data.

Accordingly, an additional object of the present invention is the utilization of a continuously monitored reference detector which will determine the energy level of the infrared source and provide information with respect to the drift of the energy from this source from a predetermined norm in order that the output information will be independent of variations in the energy source. It will not be necessary in such instance to provide means for varying the energy source as long as the energy source stays within certain predetermined wide limits, but rather any variation within those predetermined wide limits from a norm will be determined and the information with respect to the variation will be fed into the device which provides an output with respect to the signals received through the lens under test and will provide an automatic correction for variations in the energy level from the source from the norm.

The foregoing and many other objects of the present invention will become apparent in the following description and drawings in which.

Figure 1:
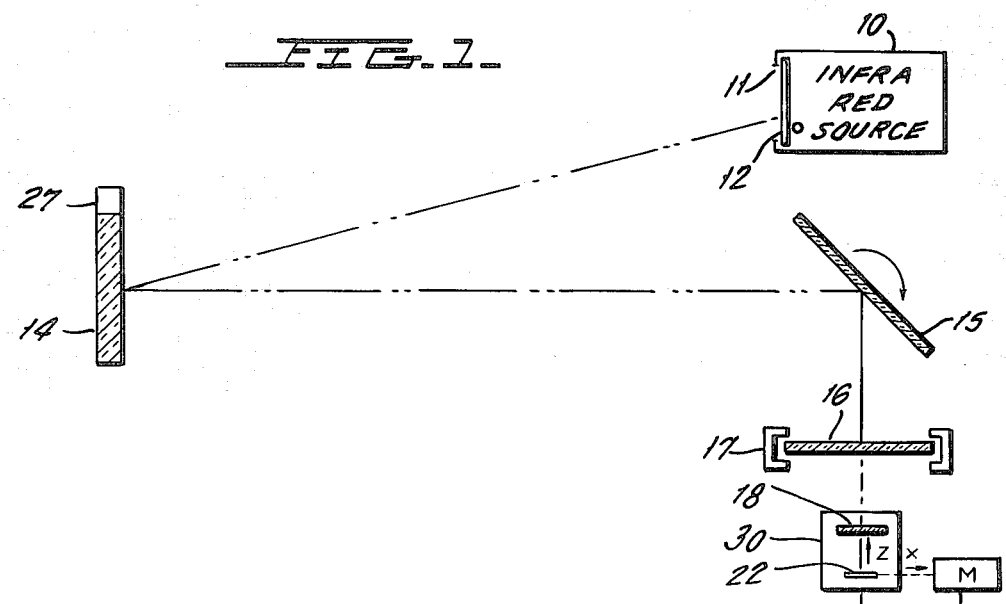
FIG. 1 is a schematic view of the structure and operation of the present invention.

Referring first to the schematic view of FIG. 1 in the infrared energy is emitted from a glow bar source 10 having an appropriate filter adjacent the slit 11 and a chopper 12. The chopper 12 may be operated at any desired frequency in a well known way such as at a frequency of the order of 10 cycles in order to provide modulation of the energy source which may be utilized in the computer hereinafter described in order to distinguish the energy source from other heat sources. The slot or aperture 11 is in the focal plane of a collimator lens 14. The size of the slot or aperture 11 and the focal length of the collimator lens 14 are chosen to provide the desired spot size in the focal plane of the lens under test.

The energy passes from the collimator lens 14 to a folding mirror 15 which is rotated to position the parallel or collimated coherent light input either on axis or off axis to the lens under test. The energy then passes through the lens 16 which is under test. The lens 16 is supported in any appropriate amount 17 which will hold the lens firmly and permit the lens 16 under test to be removed and another lens to be positioned in its place. The support or fixture 17 for the lens 16 which is under test is arranged to allow repeatable and predictable placement of the lens so that the flange focus can be measured accurately.

The energy is focused by the test lens directly in front of a field lens 18 behind the knife edge. The field lens focuses the exit pupil of the test lens onto the signal detector 20. The utilization of a field lens 18 ensures that all the energy exiting from the test lens is incident upon the detector independent of the focal point of the test lens within the specified tolerance. Therefore there is no need to hunt for a peak signal. Also, the energy is spread over the detector removing problems due to "hot spots" on the detector.

A shutter 22 having a knife edge scans in the convergent beam of the test lens 16 progressively obscuring the detector. The knife edge is driven from the reference point by a stepping motor 23. The output of the signal detector 20 is fed into the computer 25 where the digitalized signal is then assessed. This output data is utilized to compute the modulation transfer function.

Figure 2:
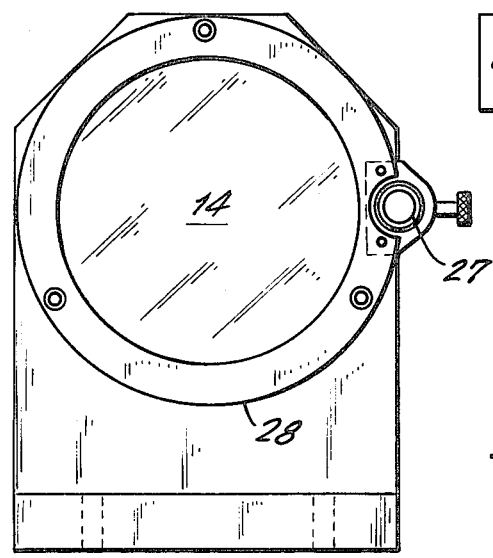
FIG. 2 is an elevation showing the collimating mirror and reference detector.

While the measurement is under way the source at the aperture 11 is viewed by reference detector 27. The reference detector 27 as shown also in FIG. 2 is mounted on the frame 28 which holds the collimating lens 14 and is essentially in the same plane as the collimating lens. The reference detector is utilized to determine if there is any drift in the source over the term of the measurement of the modulation transfer function. The reference detector output is sampled in the computer 25 each time that the data detector is sampled. A change in the reference detector is then used to compute a normalizing factor for the modulation transfer function.

A typical modulation transfer function measurement would then proceed as follows:

The lens 16 is placed in the fixture 17. A check is made to ensure that the proper source 10 is in place. The filter at the aperture 11 is appropriately located and the detector 20 is properly in place.

Power is then turned on.

Preferably the operating system will be stored in a Read Only Memory so that all that the user must do is press a reset button and order the program to run.

The computer then proceeds to execute the built in test program. A panel light will indicate that this phase of the program is executed. The system will check itself out and print out what components, if any, are not functional. The test program will check for (a) source of energy 10 is up to the appropriate temperature, (b) adequate output is obtained from the reference detector 27 and data detectors but not beyond the limits of the device and (c) the appropriate filter is in place at the aperture 11.

The knife edge shutter 22 is mounted on a base platform 30. The platform may be driven in the axis in a plane which intersects the light beam. The knife edge mounted on the platform may be driven with respect to the platform also in an x axis which intersects the beam or in a z axis in which the shutter is moved toward and away from the lens under test.

The mirror 15 may be rotated to an initial position which directs the energy source through the desired section of the lens under test.

The device is built so that the various motors will operate automatically under control of the program in the computer to rotate the mirror 15, move the platform 30 with respect to the sensor, move the knife edge to its desired axial position in order to provide a detectable signal and then provide a signal that the device is ready for test.

These elements are not described in detail because, individually, each of them is known and used. Thus, in particular, means for driving the knife edge shutter in the x, y and z planes are known. This has previously been by cut and try methods involving individual movements and individual measurements as opposed to the programmed corrected measurements of the present invention.

For any particular lens having a predictable depth of focus within desired stop or light admitting parameters, the tolerance in the depth of focus is such that there is invariably one most desirable plane within the range of the depth of focus and it is therefore the major object of the present invention to determine automatically which is this desirable plane.

It would seem most obvious to step through the tolerance in focus in increments smaller than the depth of focus taking a modulation transfer function curve at each plane and selecting the plane of best focus as the one which yields the maximum modulation transfer function. That is, the knife edge shutter platform is driven on the z axis in selected increments and at each selected position a signal is produced. The knife edge shutter is caused to scan to produce a series of successive signals related to the output energy which passes therethrough. The particular plane in which the series of successive signals produces the highest level of output energy will then be the plane within the range of tolerances for the particular depth of focus for which the particular lens will operate at its maximum efficiency (best plane of modulation transfer).

Various methods have been proposed, the most obvious one of which is to step through the tolerance in focus in increments smaller than the depth of focus taking a modulation transfer curve at each plane and selecting the plane of best focus as the one which yields the maximum modulation transfer function. The time involved may be substantial and might be as much as twenty minutes to find the best focus.

A second solution is to measure the maximum transfer function at coarser settings and return to the position of best maximum transfer function for smaller steps. This would require a multiplicity of coarse scans, of the order of ten coarse scans and three fine scans or 7½ minutes.

The third method is the use of a binary search using a line spread initially and then high frequency modulation transfer function.

Therefore the position of best focus and modulation transfer function for that position on axis may be determined in accordance with the present invention in two minutes. This would also yield the flange focal distance since the position of best focus is known accurately by the number of steps that the knife edge moved from the reference in the z direction.

The computer then prints out the on axis modulation transfer function and flange focus and the test then proceeds to the steps for off axis modulation transfer function.

Appropriate signals may be provided to show the operator that the system is performing the off axis modulation transfer function. The knife edge shutter is driven to its freely open position. The folding mirror 10 is ordered by the computer to the off axis position. The stage or platform 30 containing the knife edge, the field lens and detector is driven to the off axis measurement position recognized when the signal of the data detector reaches peak value.

There is now no need for a focus search since the knife edge has been moved off axis in the plane of best focus. The modulation transfer scan is now performed by driving the knife edge as previously described. The measurement of the off axis modulation transfer function yields not only off axis modulation transfer function but also the E.F.L. which is derived from the known angle off axis and the known distance off axis yielded from the knife edge and x stage slides. This last procedure will take 30 seconds for the modulation transfer function scan, less than 10 seconds for the positioning of the slides and approximately one minute for print out assuming a 10 CPS printer. Therefore, the time required for an entire measurement would be:

| | |
|---|---|
| BIT (Build In Test): | 10 seconds |
| On Axis | 2 minutes |
| M.T.F. Auto Focus: | |
| Off Axis | 40 seconds |
| M.T.F. and E.F.L.: | |
| Print out | 1 minute |
| Total less than | 3 minutes (excluding lens positioning time and printout time) |

This concept has significant advantage over other automatic test equipment currently available. These features and advantages are summarized as follows:

| Parameters Measured | Accuracy |
|---|---|
| Flange focus | ±.0005 in. |
| On Axis: Off Axis M.T.F. | 1 std. deviation less than 1% at all frequencies. |
| E.F.L. | ±.001 in |

3 minutes measurement time.

Automatic focus requires the operator only to set the tolerance for focus. Optimum focus is then found automatically. Built in test safeguards are provided. The use of the reference detector takes any drift in source output into account automatically to improve measurement accuracy. The use of pyroelectric detectors means that no cooling is required. The use of a micro-computer minimizes cost and volume requirements over a mini-computer. The reflective collimator permits system operation over a broad spectrum with appropriate hardware changes.

After deciding on the basic concept of measuring M.T.F. via a knife edge scan, the next pressing consideration was how many data points per scan, and at what S/N (signal to noise ratio), are required in order to achieve a $1 \leq$ variation in M.T.F. at frequencies up to 10/ mm. The answer to this lies an analyzing the method which is used to compute the M.T.F. from the knife edge function or software.

Figure 3:
FIGS. 3 and 4 are graphic presentations referred to in the description.

Assume the knife edge function shown in FIG. 3: $G(x)$

The optical transfer function (OTF(w)) of which the modular transfer function (M.T.F.) is the magnitude, is defined as the normalized fourier transform of the line spread function. The line spread function is the derivative of the knife edge function. This is expressed mathematically in equation 1.

$$MTF(w) = |OTFF(w)| = \left| \frac{\int_{-\infty}^{\infty} \frac{dG(x)}{dx} e^{iwx} dx}{\int_{-\infty}^{\infty} \frac{dG(x)}{dx} dx} \right| \quad (1)$$

Eq. 1

The term in the denominator represents the normalizing factor to equate the M.T.F. at W=0 to unity. Equation 1 may be simplified to:

$$MTF(w) = \left| \frac{\int \frac{dG(w)}{dx} \cdot e^{iwx} dx}{G(\infty) - G(-\infty)} \right| = \frac{\left| \int \frac{dGw}{dx} \cdot e^{iwx} dx \right|}{G_{max} - G_{min}}$$

For computation purposes substitute:

so that $e^{iwx} = \cos wx + i \sin wx$ $$MTF(w) = \frac{\left| \int \frac{dG(w)}{dx} \cos wx dx + i \int \frac{dGw}{dx} \sin wx dx \right|}{G_{max} - G_{min}}$$

Recalling that the magnitude of a complex number is the principal value of the square root of the sum of the squares of the real and imaginary parts, $$MTF(w) = \frac{\left[ \left( \int \frac{dG(w)}{dx} \cos wx dx \right)^2 + \left( \frac{dG(w)}{dx} \sin wx dx \right)^2 \right]^{\frac{1}{2}}}{G_{max} - G_{min}}$$

This integral implies a continuum of data points; obviously, the data sampled will in effect approximate the integral by a sum causing an error. This error may be approximated as a function of data point spacing as follows:

Consider the line spread function $dG(x)/dx$; sampling it every $\Delta x$ is equivalent to multiplying the function by a series of delta functions spaced $\Delta x$ apart. In fact, this is not sampling $dGx/dx$ but $G(x)$ every $\Delta x$, or integrating $dGx/dx$ for $\Delta x$. This is equivalent to having a sample width of x. Mathematically this may be expressed as:

$$H(x) = \frac{dG(x)}{dx} \cdot \left[ \text{comb} (\Delta x) \times \text{rect} \left( \frac{\Delta x}{2} \right) \right] \quad \text{Eq 4}$$

where
$H(x)$=sampled function
$\text{comb}(\Delta x)$=series of delta functions spaced $\Delta x$ apart
$\text{rect}(\Delta x/2)$=rectangle function of width $\Delta x$ when convolved with comb $\Delta x$ will produce a sample width of $\Delta x$
$x$ =convolution
$\cdot$ =multiplication.

Recalling that multiplication in the spatial domain is equivalent to convolution in the frequency domain and that convolution in the spatial domain is equivalent to multiplication in the frequency domain, the Fourier transform of H(x) may be computed by inspection to be $$h(\omega) = F\left\{ \frac{dG(x)}{dx} \right\} x [\text{comb} (\omega_s) \cdot \text{Sinc} (\omega_s)] \quad \text{Eq 5}$$

Figure 4:
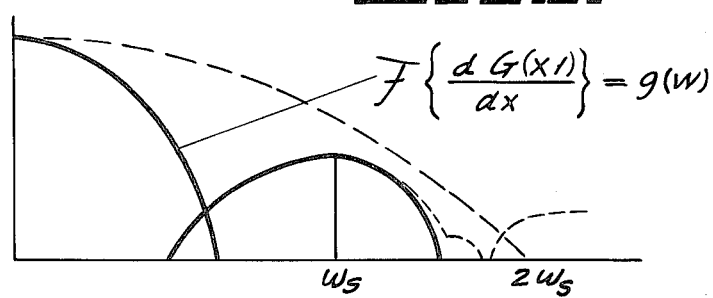
Figure 5:
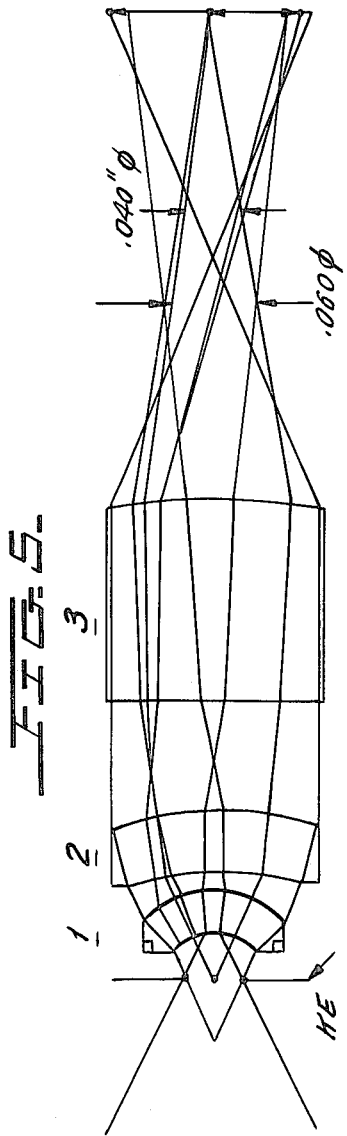
FIG. 5 is a further graphic representation of field lens data.
Figure 5:
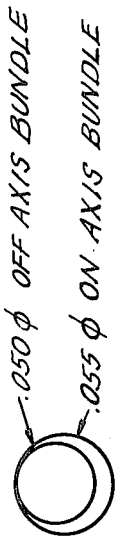

If equation 5 is plotted, FIG. 4 is obtained.

The transform of the line spread function appears in the base band and is also repeated on a carrier at multiples of $\omega_s$, the sampling frequency. The carrier amplitudes rather than being all equal are in an envelope described by $$\sin \frac{(\pi \omega/(\omega s)}{(\omega s)}.$$

Therefore, the information in the base band is desired plus information from harmonics of $\omega s$. It can be seen that $$h(\omega) = g(\omega) + \sum_{n=1}^{\rightarrow} g(n\omega_s - \omega) \frac{\sin\left(h\frac{\pi}{2}\right)}{n\pi/2} \quad \text{Eq 6}$$

Calculate $\omega_s$ such that $$h(\omega) = g(\omega) + (<0.003)$$

This requires some a priori knowledge of $g(\omega)$.

Assume that the optical spot which is measured is gaussian. It will therefore have an M.T.F. of the form $$g(\omega) = e^{-a\omega^2}$$

Assume that an infrared objective must have an M.T.F. (20 1 p/mm) = 0.44

Consider only the first term in the sum of equation 6.

$$\frac{2}{\pi} e^{-a(\omega_s - \omega h)^2} < .003$$

Given $e^{-a\omega h^2} = .44$ solving $\omega_s > 3.5\ \omega_h$

Therefore, a sample is taken at a rate greater than 3.5 times the highest frequency of interest for which an accuracy is assured of greater than ½ of one percent in determining $g(\omega_h)$. Since this is strictly true only for a gaussian spot, a safety factor of 5 samples for the highest frequency is used to accommodate variations from a gaussian. Therefore for a frequency of 20 1 p/mm one must sample once every 10 μm to satisfy the above criterion. In addition, one would like to sample over at least one cycle to measure a low frequency M.T.F. at 2 1 p/mm. This will require 50 samples/M.T.F.

All of the discussion thus far has not considered the effects of noise or what s/n is required for given accuracy in M.T.F.

Assume $$G(x) = G(x) + n(x)$$

where
N(x) = noise function
G(x) = knife edge function then $$\frac{dG'(x)}{dx} = \frac{dG(x)}{dx} + \frac{dn(x)}{dx}$$

and $$M.T.F. = \left| \int \frac{dG(x)}{dx} e^{iwx} dx \right| =$$

$$\left| \int \frac{dG(x)}{dx} e^{iwx} dx + \int \frac{dn(x)}{dx} e^{iwx} dx \right|$$

but $$\int \frac{dN(x)}{dx} e^{iwx} dx = iw \int N(x) e^{iwx} dx$$

It is interesting to note that while noise peaks at higher frequencies, a higher s/n is required to achieve the same accuracy in M.T.F. as a low one. A computer simulation was run to determine the effect of s/n on M.T.F. for a gaussian spot.

The simulation indicated that a pyroelectric detector proved to provide satisfactory performance.

Utilization of various elements of the present invention is known including the collimator, the folding mirror and mounting thereof and the knife edge shutter platform and means for moving the shutter. The utilization, however, of the reference detector and the feeding of the signal from the reference detector directly into the computer or other device which receives the signal from the sensor 20 in order to normalize the signal for possible variations from the source 10 obviates the need for continuously monitoring the source 10 and obviates the much more difficult problem of changing the energy output from the source 10 in order to attain a specific extremely accurate optimum level of performance. As long as the source 10 emits energy within a range which is usable by the sensor 20 and the computer 25 then variations in this energy detected by the reference detector 27 will be utilized directly either on the sensor or, more desirably, in the computer to provide a correction for the energy level from source 10 which will provide a normalized base for the computations.

In summary the device therefore operates automatically to take a sweep through one focal plane of the lens. It then takes a sweep through a second focal plane of the lens. The whole lens is being used at all times. The device determines which of the two focal planes produces a better modulation transfer function or a better resolution. It then proceeds to make a third transit through the focal plane at the mid-point between these two. It determines in which direction a modulation transfer function is being improved either toward the first reading or toward the second reading. It will then operate, if the reading at the second was better than the first, to a fourth reading halfway between the third and the second. The device proceeds along this type of logic until a modulation transfer function is produced which is either a repeat of the previous focal plane indicating that no further improvement is found by going further or that the step in focus that the machine will have to make to go from one focal plane to the next adjacent plane to be tested is less than an assumed value nominally one thousandth of an inch. This calculation has not been achievable prior to the present invention on a microcomputer. The result is a substantial saving in cost over a mini-computer.

The use of the reference detector makes it possible to use an uncontrolled heat source (that will nevertheless function within certain, rather wide, limits) and the ability to measure transmission in flange focus. While the explanation for this is that a reference detector is constantly looking at the source of infrared energy while the data detector is used to look at the output of the knife edge going through the focal point this ensures that all changes on the data detector are due to the knife edge rather than changes in source temperature.

The reference detector thus becomes important. Its output is constantly monitored so that if there is a drift in source temperature this is reflected in the reference detector and the computer can compensate for it. This has a beneficial effect on the ability to measure transmission because the transmission measurement can take place over a relatively long period of time.

In the process of performing tests after one lens has been tested it must be demounted and a second lens mounted in place. This may possibly take a minute or two. During this time the output of energy from the source 10 can drift in temperature. If this happens it would not be possible to determine whether the change in signal was due to a poor transmission of the first lens relative to the second or whether the source has drifted. By having the reference detector which is constantly monitoring the temperature of the source, then any drift in the source can be compensated.

Therefore, the present invention provides a relatively long term stability in measurement which will allow the measurement of transmission for substantial periods and for a large number of kits.

The measurement of flange focus or the capability of measuring flange focus does not relate to the reference detector but rather to the calibration of the z axis translator. In the micro-computer, built in ROMs are used and an interchangeable circuit card may be utilized to replace a portion of the ROM memory which will essentially dedicate the device to a particular lens type rather than having to input the lens characteristics at the time that the lens is being measured. This is particularly applicable for production use when the same lens type is measured many times over.

The system therefor performs (a) a built in test, (b) auto sensing, (c) auto focusing, (d) operates in a micro programming mode. The system in the first series of function tests determines that all of the translation stages are working, that the detector output is within a range that will produce a sufficient signal so that the measurement is accurate and will prevent the production of a signal so large as to saturate the circuits.

The auto centering function places the knife edge automatically at the beginning of the stop. Since the first focal plane that may be examined may not be the best plane of focus the spot could be quite large at this point. In order to minimize the search time the system constantly senses whether the area that it is searching has useful information, —in other words, whether it is scanning across the spot rather than scanning on either side of it. But when it does find the best spot or find the position at which it is just on the edge of the spot it begins to see the auto focus. The auto focus as before described, is a binary search of the focal plane or a binary search through focal planes to determine the best plane of focus.

As indicated previously the knife edge takes one cut through a given focal plane then proceeds through the limit of the depth of focus to a second focal plane then proceeds half way inbetween. It determines which direction from the center produced a better spo and proceeds to go half way between and continues until no improvement is found in modulation transfer function or an increment in focus of less than an input amount is achieved.

The micro programming mode allows the operator to perform any of the individual tasks that the system does during the automatic phase without having to go through each task. For example, a search through any focal plane can be performed or an off axis measurement can be performed without having to go through each in a series.

Therefore, as previously pointed out one of the essential elements of the present invention is the utilization of the reference detector and the utilization of a micro computer to provide the appropriate readouts plus the appropriate directions to the platform 30 and the folding mirror 15 as well as to the shutter 22 in order to automatically program the device and operate the same.

Since many variations and modifications of the present invention will now be obvious to those skilled in the art it is preferred that the scope of this invention be determined not by the specific disclosures herein contained, but only by the appended claims.

What is claimed is:

1. Apparatus for determining the optimum focal plane of an infrared lens comprising:
   an infrared energy source and means for modulating the same;
   a collimating lens;
   means for directing energy from said infrared energy source to said collimating lens;
   a folding mirror;
   said energy being directed from said collimating lens to said folding mirror;
   an infrared detector;
   said energy being directed from said folding mirror to said detector;
   a computer;
   said detector being connected to the input of said computer;
   a platform;
   and an infrared lens holder mounted between said folding mirror and said platform; said folding mirror being for directing said energy through a selected portion of an infrared lens mounted in said lens holder;
   said platform being movable toward and away from said lens holder and also being movable parallel to said lens holder;
   a knife edge shutter mounted on said platform for movement transversely to the path of energy from said infrared lens in said lens holder to said detector;
   means for stepping said shutter in a series of steps across the path of infrared energy from said lens in said lens holder under control of said computer;
   and means for moving said platform to selected positions toward and away from said lens in said lens holder under control of said computer;
   said detector transmitting the successive energy levels for each position of said shutter at each position of said platform to said computer;
   said computer being operable for controlling said means for moving said platform to move said platform successively to a plurality of successive platform positions each within the range of the depth of focus of said lens and each within a respective focal plane of said lens in said lens holder, said computer further being operable when said platform is at each of said successive positions for controlling said means for stepping said shutter to step said shutter across said respective focal plane; said computer being further operable for providing a read out of said successive energy levels at each of said successive positions;

said computer being further operable for moving said platform to first, second and third ones of said successive platform positions, for stepping said shutter and for providing a read out at each of said positions; said computer being further operable for moving said platform to a fourth position between the two adjacent positions of the first, second and third positions having the higher energy level read outs, for stepping said shutter and for providing a read out at said fourth position;

and an additional infrared energy sensor in the path of energy from said energy source;

said additional infrared energy sensor detecting variations in the energy from said energy source and being connected to said computer to provide a normalizing signal for said computer to vary the usable input signal from said detector in said computer to a level, for each operation, which starts from the same base.

2. The apparatus for determining the optimum focal plane of an infrared lens of claim 1 wherein said computer is further operable for taking a read out at an additional position between said fourth position and the one of the two adjacent positions having the higher energy level read out.

3. The apparatus for determining the optimum focal plane of an infrared lens of claim 2, said computer being further operable for repeating said successive positions and read outs until a final position is reached at which no detectable change in energy level output read out is obtained.

4. The apparatus for determining the optimum focal plane of an infrared lens of claim 3, said computer being further operable for controlling said successive positions of said platform, following each position with successive stepping of said knife edge shutter and providing read outs for each position including the final position.

* * * * *